US012009763B2

(12) United States Patent
Sykora et al.

(10) Patent No.: US 12,009,763 B2
(45) Date of Patent: Jun. 11, 2024

(54) MODE SWITCHING FOR A CENTRIFUGAL COMPRESSOR

(71) Applicant: TRANE INTERNATIONAL INC., Davidson, NC (US)

(72) Inventors: Benjamin J. Sykora, Stoddard, WI (US); Petri J. Mäki-Ontto, Espoo (FI); James W. Ziemer, Cashton, WI (US); Matthew A. Shepeck, La Crosse, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 0 days.

(21) Appl. No.: 18/556,753

(22) PCT Filed: Apr. 22, 2022

(86) PCT No.: PCT/IB2022/053793
§ 371 (c)(1),
(2) Date: Oct. 23, 2023

(87) PCT Pub. No.: WO2022/224222
PCT Pub. Date: Oct. 27, 2022

(65) Prior Publication Data
US 2024/0088810 A1    Mar. 14, 2024

Related U.S. Application Data

(63) Continuation of application No. 17/238,300, filed on Apr. 23, 2021, now Pat. No. 11,770,087.

(51) Int. Cl.
*H02P 27/06* (2006.01)
*F24F 11/86* (2018.01)
*H02P 13/06* (2006.01)
*H02P 25/18* (2006.01)

(52) U.S. Cl.
CPC ............ *H02P 25/184* (2013.01); *F24F 11/86* (2018.01); *H02P 2207/055* (2013.01)

(58) Field of Classification Search
CPC ........ H02P 27/06; H02P 25/184; H02P 13/06; F24F 11/86
See application file for complete search history.

(56) References Cited

U.S. PATENT DOCUMENTS

| 4,446,415 A | 5/1984 | Taylor et al. | |
|---|---|---|---|
| 5,614,799 A * | 3/1997 | Anderson | H02P 1/32 318/776 |
| 5,821,660 A * | 10/1998 | Anderson | H02K 3/28 318/400.11 |

(Continued)

FOREIGN PATENT DOCUMENTS

KR    10-2019-0040035 A    4/2021

OTHER PUBLICATIONS

International Search Report and Written Opinion, International Patent Application No. PCT/IB2022/053793, dated Jul. 29, 2022 (9 pages).

*Primary Examiner* — Thai T Dinh
(74) *Attorney, Agent, or Firm* — HSML P.C.

(57) ABSTRACT

The technologies described and recited herein pertain to a permanent magnet motor having multiple voltage taps so that the motor may run in multiple configurations, e.g., a low-range and a high-range, and have multiple optimal operating points.

13 Claims, 5 Drawing Sheets

(56) References Cited

U.S. PATENT DOCUMENTS

| | | | | |
|---|---|---|---|---|
| 6,135,720 A * | 10/2000 | Boller | ............... | F04C 28/08 |
| | | | | 318/773 |
| 9,059,658 B2 * | 6/2015 | Bates | ............... | H02P 25/18 |
| 9,450,530 B2 * | 9/2016 | Zahora | ............... | H02P 29/60 |
| 10,944,350 B2 * | 3/2021 | Shizu | ............... | H02P 27/06 |
| 11,070,157 B2 | 7/2021 | Kashima et al. | | |
| 2002/0067093 A1 | 6/2002 | Das | | |
| 2004/0132198 A1 * | 7/2004 | Burshteyn | ............ | B01D 61/147 |
| | | | | 436/63 |
| 2009/0311092 A1 | 12/2009 | Broqueville | | |
| 2010/0083693 A1 | 4/2010 | Todd et al. | | |
| 2015/0377537 A1 | 12/2015 | West et al. | | |
| 2018/0175752 A1 | 6/2018 | Takeoka et al. | | |
| 2020/0021224 A1 | 1/2020 | Nigo | | |
| 2021/0057950 A1 | 2/2021 | Schuler et al. | | |

\* cited by examiner

MODE SWITCHING FOR A CENTRIFUGAL COMPRESSOR

FIELD

This disclosure relates generally to operating modes of centrifugal compressors for heating, ventilation, air conditioning, and refrigeration (HVACR) systems.

BACKGROUND

Centrifugal compressors are widely used in HVACR systems. Motors that run such centrifugal compressors are designed for particular speed and torque conditions and, therefore, component-sizing may be influenced by an operating current of the motor. For example, when motors operate at partial-speed conditions, the corresponding voltage may be lower than at optimal speed conditions while the corresponding current value may be higher than at optimal speed conditions. Such limitations have been a deterrent to the development and/or deployment of HVACR systems that provide both ecological and economic efficiencies. Solutions are sought as market demands for more energy and cost-efficient solutions for dual mode HVACR systems grow.

SUMMARY

In accordance with at least one example embodiment, a permanent magnet motor for an HVACR system includes a rotor, voltage taps that variably connect the rotor to either of a low-range voltage path and a high-range voltage path, and a VFD that is variably connected to the rotor via either the low-range voltage path or the high-range voltage path.

In accordance with at least one other example embodiment, a method of controlling an operating mode of a permanent magnet motor in an HVACR system includes controlling speed of a rotor corresponding to the permanent magnet motor by switching between wye-delta connections between the rotor and a VFD.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different FIGS. indicates similar or identical items.

DETAILED DESCRIPTION

Figure 1:
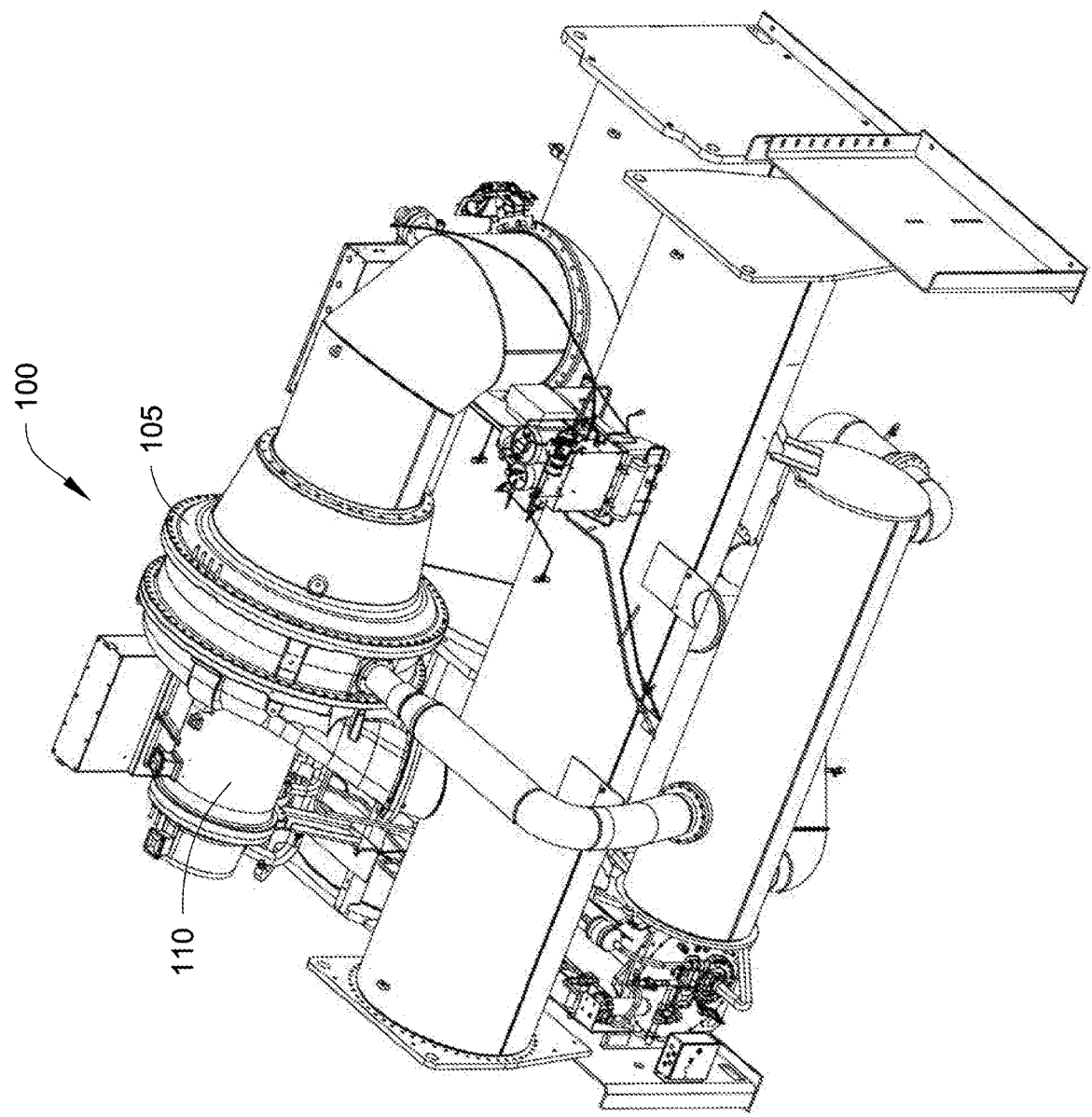
FIG. 1 illustrates a heating, ventilation, air conditioning, and refrigeration (HVACR) system, in accordance with at least one example embodiment described and recited herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

The scope of the disclosure should be determined by the appended claims and their legal equivalents, rather than by the examples given herein. For example, the operations or function recited in any method claims may be executed in any order and are not limited to the order presented in the respective claims. Moreover, no element is essential to the practice of the disclosure unless specifically described herein as being so.

Described and recited herein are systems, apparatuses, and methods that facilitate the switching of motor voltage for heating and cooling modes, for a dual-mode HVACR, thus procuring more power for common amp ratings for the respective modes. As described and recited herein, a dual-mode HVACR may be regarded as a dual-mode, i.e., heating and cooling device. Thus, the systems, apparatuses, and methods described and/or recited herein pertain to a motor having multiple switch-connection points to enable the motor to be run in multiple configurations, e.g., a low-range and a high-range, and having multiple operating points for heating and cooling. In accordance with at least one example embodiment, the motor may have two connection points for a VFD, thus providing variable voltage ranges.

FIG. 1 illustrates a heating, ventilation, air conditioning, and refrigeration (HVACR) system, in accordance with at least one example embodiment described and recited herein. HVACR system 100 may be any suitable HVACR system to provide heating, ventilation, air conditioning, and/or refrigeration to one or more conditioned spaces. In accordance with at least one example embodiment, HVACR system 100 is a cooling unit, e.g., a centrifugal cooling unit, having a capacity of between substantially 20 tons to substantially 500 tons or more.

Non-limiting example embodiments of HVACR system 100 may include a compressor 105, which may be driven by a motor 110.

Non-limiting example embodiments of compressor 105 may be any one of a centrifugal, scroll, screw, or other suitable types of compressor. For the present description, compressor 105 may be regarded to be a centrifugal compressor.

Figure 2:
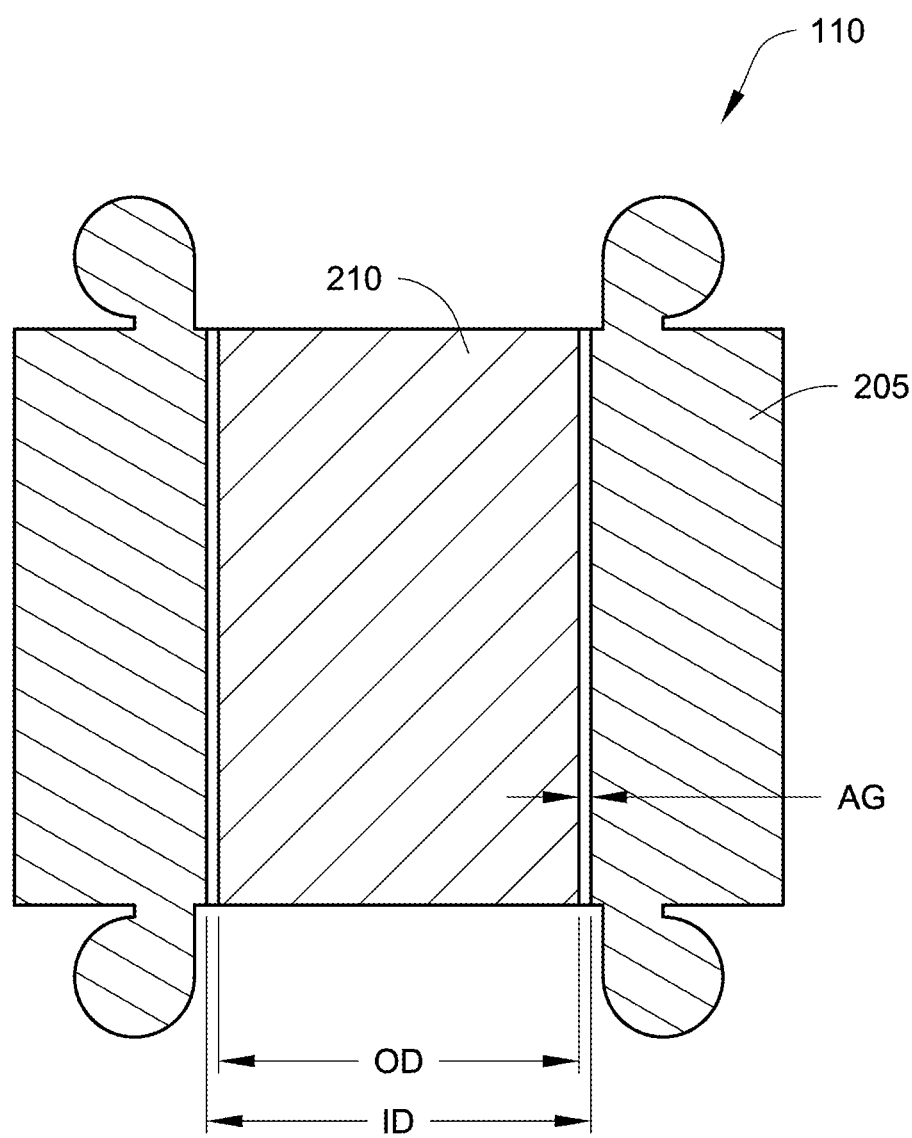
FIG. 2 illustrates a schematic diagram of a permanent magnet motor, in accordance with at least one example embodiment described and recited herein.

FIG. 2 illustrates a schematic diagram of a permanent magnet motor, in accordance with at least one example embodiment described and recited herein.

Motor 110, introduced in accordance with FIG. 1, may be a high-speed permanent magnet motor.

Motor 110 may include a stator 205 and a rotor 210. Stator 205 may have an interior diameter ID, and rotor 210 may have an outer diameter OD, with the difference therebetween being the air gap AG.

In accordance with at least one non-limiting example embodiment, motor 110 may be included in a centrifugal HVACR system, as shown in FIG. 1.

Stator 205 may be configured to generate electromagnetic torque to rotate rotor 210. Stator 205 may include a core and a winding. Stator 205 may draw power from a variable-frequency drive (VFD), as shown and described with reference to FIG. 4.

A sizing of rotor 210 may be based on, for example, modeling of the motor 110 when operating at a full load, and/or modeling of the motor 110 when operating at a partial load. In accordance with at least one example embodiment, the sizing of rotor 210 may be designed for improvement to integral part load value (IPLV) for a compressor including motor 110. IPLV may be reflective of the cost of operation of a compressor when it is at a partial load, providing a cost function for such operations.

The air gap AG may be based at least in part on the rotor surface speed for rotor 210. The rotor surface speed is a function of the diameter of rotor 210 and the design rotational speed for rotor 210 in motor 110. For example, in a high-speed motor embodiment where the surface speed of rotor 210 is between 100 and 200 m/s, the air gap AG may be, for example, between at or about 4.5 mm and at or about 7 mm. In a non-limiting example embodiment, the size of air gap AG may be from at or about 5 mm to at or about 8 mm. The air gap AG determined based on the rotor surface speed may be a magnetic air gap based on the outermost magnetic component of rotor 210 including any sleeve provided on the rotor. The magnetic air gap may not include portions of the sleeve that are non-magnetic such as carbon fiber composite portions.

Figure 3:
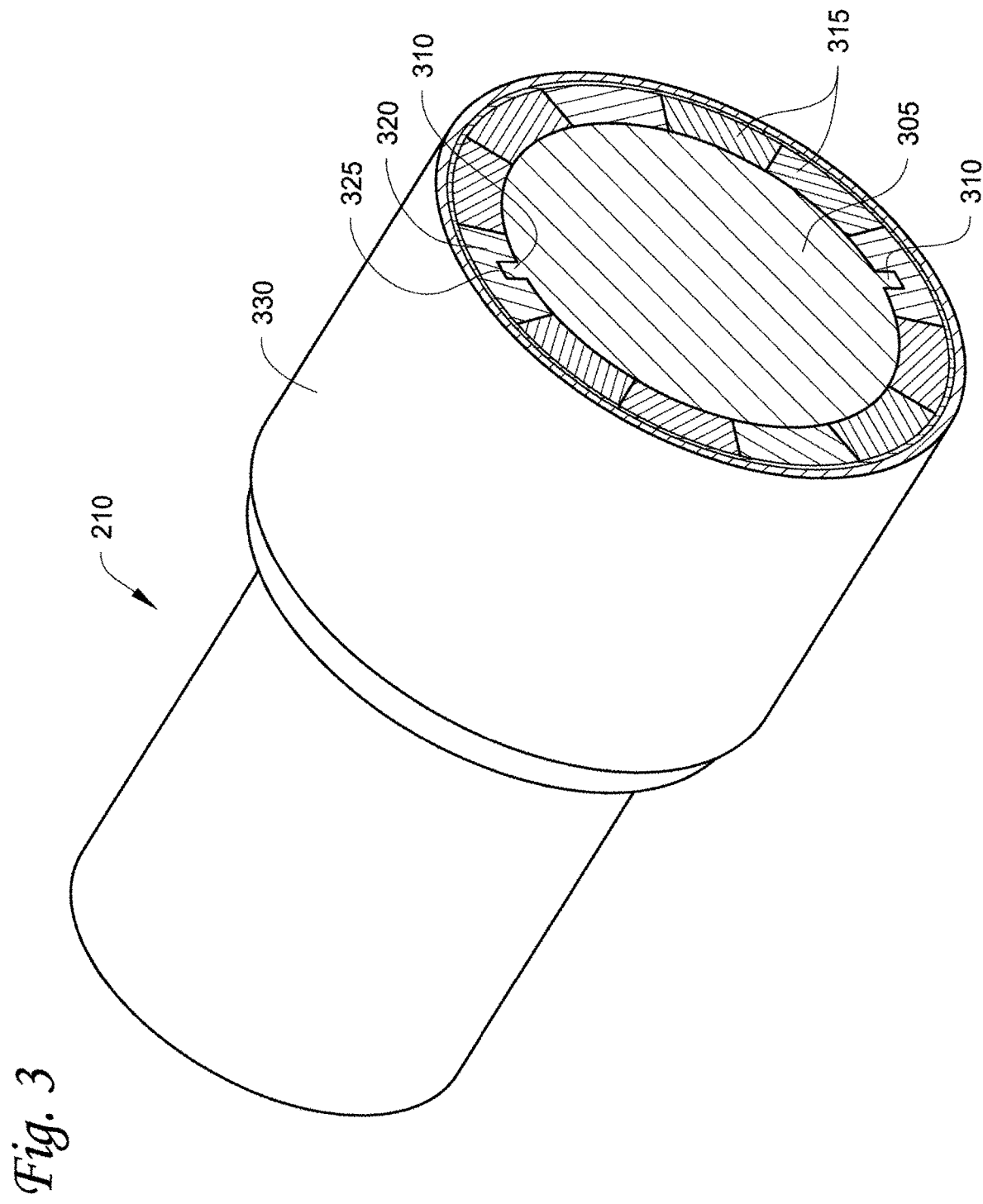
FIG. 3 illustrates a perspective view of a rotor, in accordance with at least one example embodiment described and recited herein.

FIG. 3 illustrates a perspective view of rotor 210, in accordance with at least one example embodiment described and recited herein.

Rotor 210 is a surface permanent magnet (SPM) rotor for use in an electric motor. Rotor 210 may be configured to be rotated by electromagnetic torque provided by a stator of the electric motor. Rotation of the rotor 210 resulting from the electromagnetic torque may be used to operate a device, e.g., a compressor. Rotor 210 may be joined to or incorporated into a driveshaft to be rotated by operation of the electric motor using rotor 210. The driveshaft may be used, for example, to rotate an impeller such as an impeller of a centrifugal compressor. The rotor 210 may be used in, e.g., hermetic or semi-hermetic centrifugal compressors used in cooling units and/or heating, ventilation, air conditioning, and refrigeration (HVACR) systems having capacities of between 20 and 500 tons or more.

Rotor core 305 may be a portion of rotor 210 towards a center of rotor 210.

Permanent magnets 315 may refer to a plurality of permanent magnets disposed on rotor core 305. Permanent magnets 315 may be any suitable permanent magnet material such as SmCo or NdFeB, and the like, and may be distributed radially around the rotor core 305. Pole spacers 320 may also be disposed on rotor core 305, arranged in spaces between permanent magnets 315.

Pole spacers 320, combined with permanent magnets 315, may define a plurality of magnetic poles that respond to electromagnetic torque provided by the stator of the electric motor including rotor 210. Pole spacers 320 may be any suitable material, e.g., stainless steel. Permanent magnets 315 and pole spacers 320 may abut one another. In accordance with at least one example embodiment, the permanent magnets 315 and pole spacers 320 surround the rotor core 305, and may be included in any suitable number and configuration for providing magnetic poles allowing rotation of rotor 210.

Recesses 325 may be formed in at least some of the pole spacers 320, and be configured to accommodate studs or pins, or the like. In at least some example embodiments, the interface between the recesses 325 and projections 310 may also restrict slippage of pole spacers 320 and/or permanent magnets 315 in an axial direction of the rotor 210.

Retention sleeve 330 is a sleeve surrounding the rotor core 305, permanent magnets 315, and pole spacers 320. The retention sleeve 330 may be any suitable material for retaining the permanent magnets 315 and pole spacers 320. That is, retention sleeve 330 may slide over the permanent magnets 315 and pole spacers 320. In at least one example embodiment, retention sleeve 330 is not press-fit onto the magnets 315 and pole spacers 320. Retention sleeve 330 and the interface between recesses 325 may be the sources of retention of the permanent magnets 315 and pole spacers 320 to the rotor core 305.

Figure 4:
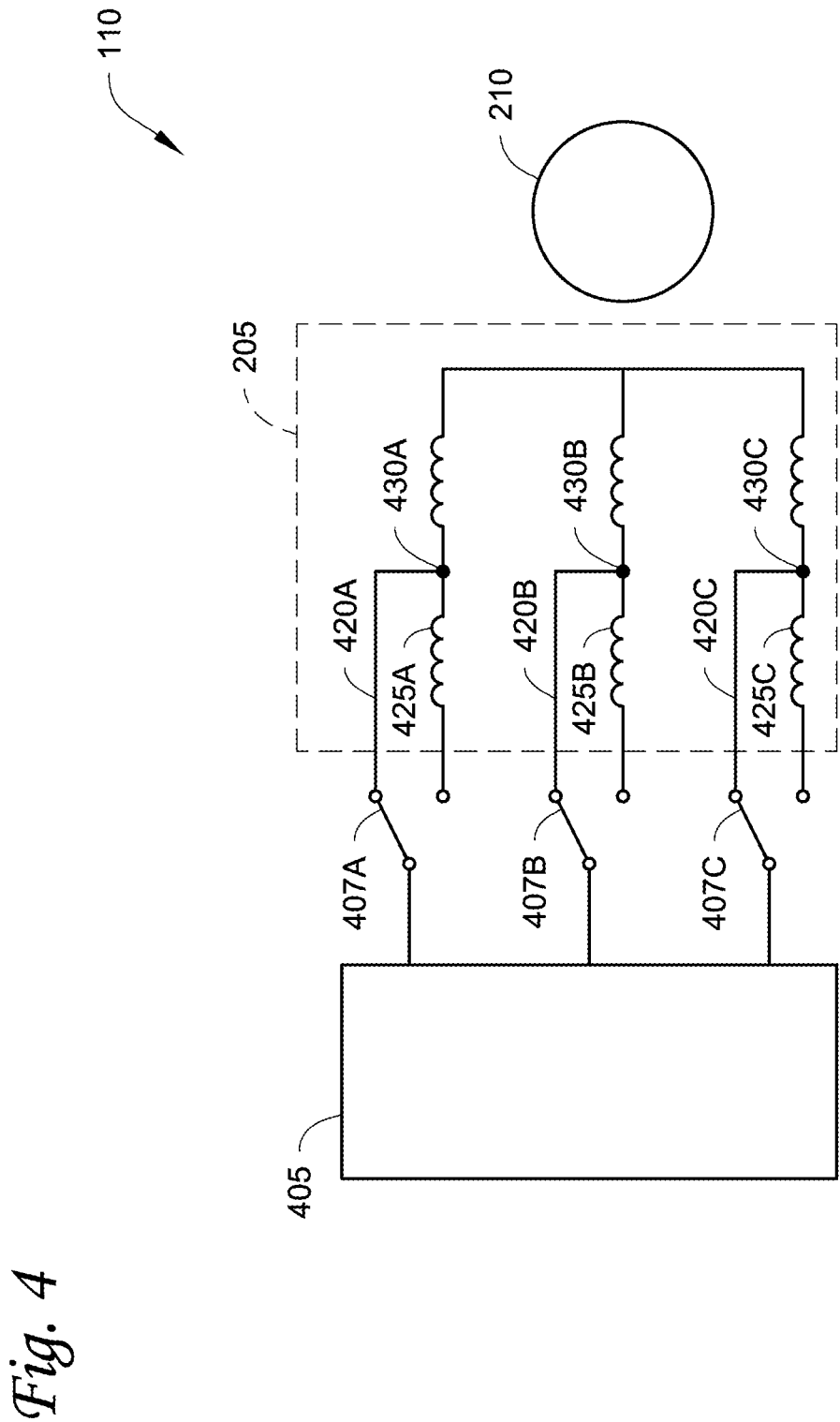
FIG. 4 illustrates a circuit representation of motor 110, in accordance with at least one example embodiment described and recited herein.

FIG. 4 illustrates a circuit representation of motor 110, in accordance with at least one example embodiment described and recited herein.

Motor 110 may include stator 205, rotor 210, and VFD 405.

Stator 205 may include multiple switch-connection points to enable motor 110 to run in multiple configurations, e.g., a low-range voltage and a high-range voltage, for multiple operating points. In accordance with at least one example embodiment, the motor may have two connection points for a variable-frequency drive (VFD), thus providing variable voltage ranges.

Stator 205 may draw power from VFD 405, and be configured to generate electromagnetic torque to rotate rotor 210. Stator 205 may include multiple voltage taps, i.e., switches, 407A, 407B, 407C that are set for maximum VFD output voltage at desired operating points for a dual-mode HVACR system. The non-limiting example embodiment of FIG. 4 shows a three-phase motor and therefore includes voltage taps 407A, 407B, and 407C. However, the embodiments of mode switching for a centrifugal compressor are not so limited with regard to a number of phases or the corresponding number of voltage taps. Further, unless context requires otherwise, reference will be made herein to voltage taps 407 since the taps are to be switched, in the off-state, in uniformity with each other.

Stator 205 may have voltage taps 407A, 407B, and 407C to variably connect rotor 205 to respective low-range voltage paths 420A, 420B, 420C at a low-range value of, e.g., 230V, or to respective high-range voltage paths 425A, 425B, 425C at a high-range value of, e.g., 460V. That is, the high-range may correspond to grid voltage in the range of 400V, 460V, 575V, 690V, 3.3 kV or 4.16 kV. The low voltage range may be a fixed fraction of the high voltage range, in accordance with how a corresponding winding of stator 205 is tapped. For example, a four-pole motor with two winding branches in series in each phase, see FIG. 5, may be tapped in a middle of a branch. Therefore, connecting to the taps may yield approximately half of the voltage of the tapped branch. Thus, according to the example, the sum voltage of one branch and one half may be three-quarters of the high voltage range.

Regardless, as set forth above, because of the uniformity of the respective high-range voltage paths and the low-range voltage paths, reference will be made herein to high-range voltage paths 425 and low-range voltage paths 420, unless context requires otherwise.

In accordance with example embodiments described and recited herein, switching voltage taps 407 to VFD 405, via high-range voltage paths 425, provides sufficient output voltage and current to activate the dual-mode HVACR system for lower speeds as a cooling system; and switching voltage taps 407 to VFD 405, via low-range voltage paths 420, provides sufficient output voltage and current to activate the dual-model HVACR system for higher speed as a heating system. Thus, as shown at least in FIG. 4, motor 110 is optimized for different operating points as both a cooler and a heater. That is, motor 110 has multiple connections so that the motor may operate in more than one configuration, e.g., a low-range voltage and a high-range voltage, and have more than one operating point. As an example, stator 205 has a second voltage path to VFD 405 that may be optimized for heating mode, which operates at a higher speed than for a cooling mode.

In accordance with at least some of the example embodiments described and recited herein, mode switching is facilitated in an off-state. That is, demand for heating or cooling is unlikely to change rapidly, thus obviating a need for the switching during operation of motor 110. Further, switching during operation of motor 110 is likely to incur overcurrent.

In accordance with at least some of the example embodiments described and recited herein, VFD 405 may be motor-tuning differently for operation in a chilling or cooling mode and for operation in a heating mode due to differences in inductance, resistance, and flux linkage in the low-range voltage path and the high-range voltage path. Further, pulse-width modulation (PWM) frequency and path may be optimized for the operating modes because, e.g., the voltage taps for the low-range voltage path have a lower inductance than that of the high-range voltage path, and therefore operate with a higher PWM frequency.

| MODE | Switch Position | Wye/Delta Configuration | Motor voltage (volts/ RPM) | Max. Motor Speed at system rated voltage | HVAC usage |
|---|---|---|---|---|---|
| "High-range voltage" | 425 | Wye | High v/rpm | Low speed | Cooling |
| "Low-range voltage" | 420 | Delta | Low v/rpm | High speed | Heating |

Figure 5:
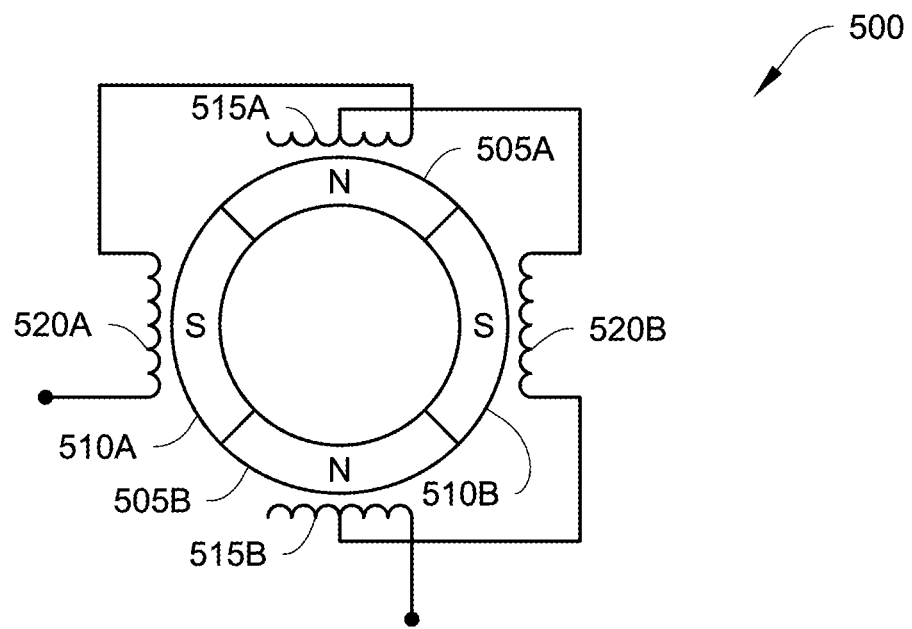
FIG. 5 illustrates a schematic diagram of multi-range permanent magnet motor, in accordance with at least one example embodiment described and recited herein.

FIG. 5 illustrates a schematic diagram of a multi-pole permanent magnet motor, in which some winding branches are tapped, in accordance with at least one example embodiment described and recited herein. As set forth above, motor 110 may be a high-speed permanent magnet motor. In accordance with non-limiting example embodiments described and recited herein, a motor pole number is a multiple of four (4), and four winding branches therefore are in series.

That is, as shown in the non-limiting example embodiment of FIG. 5, multi-tap-four-pole motor 500 has N-poles 505A and 505B and S-poles 510A and 510B. Unless context otherwise requires, the descriptions herein may refer to N-poles 505 and S-poles 510 with deference to the symmetry among N-poles 505A and 505B, as well as among S-poles 510A and 510B.

As shown in FIG. 5, winding branches 515A, 515B, 520A, and 520B, individually corresponding to N-poles 505 and S-poles 510, are disposed in series. Unless context otherwise requires, the descriptions herein may refer to N-pole windings 515 and to S-pole windings 520 with deference to the symmetry therebetween.

Figure 6:
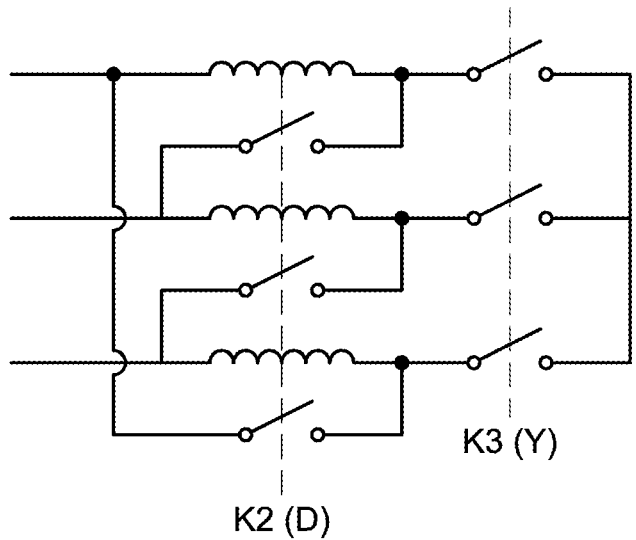
FIG. 6 illustrates a wye-delta connection, in accordance with at least one example embodiment described and recited herein.

FIG. 6 illustrates a wye-delta connection, in accordance with at least one example embodiment described and recited herein.

The example embodiments described and recited herein pertain to controlling a speed of a rotor corresponding to a permanent magnet motor by switching between wye-delta connections between the rotor and VFD.

A wye-delta connection is typically utilized to reduce voltage when starting an induction motor and therefore is not typically utilized in connection with a permanent magnet motor, as in the embodiments described and recited herein.

Advantageously, however, in connection with a permanent magnet motor as described and recited herein, the wye-connection enables the motor to run in a lower speed operation, whereby higher back EMF (electromotive force) corresponds to higher torque and lower current in operation; and the delta-connection enables the motor to run in a higher speed operation corresponding to lower back EMF. Typically, the delta-connection requires ($1/\sqrt{3}$) less voltage, i.e., approximately 58%, relative to wye-connection.

ASPECTS

It is appreciated that any of aspects 1-10 may be combined with any of aspects 11-20, and that any of aspects 1-10 and 12-20 may be combined with aspect 11.

Aspect 1. A permanent magnet motor for a heating, ventilation, air conditioning, and refrigeration (HVACR) system, comprising:
a rotor;
voltage taps to variably connect the rotor to either of a low-range voltage path and a high-range voltage path; and
a variable frequency drive (VFD) variably connected to rotor via either the low-range voltage path or the high-range voltage path.

Aspect 2. The permanent magnet motor of Aspect 1, wherein the voltage taps connect the rotor to the VFD via the low-range voltage path to implement the HVACR system as a heating system.

Aspect 3. The permanent magnet motor of either of Aspects 1 or 2, wherein the low-range path carries a voltage of 230V.

Aspect 4. The permanent magnet motor of any of Aspects 1-3, wherein the low-range voltage path carries a maximum VFD output voltage for a heating system.

Aspect 5. The permanent magnet motor of claim 1, wherein the voltage taps connect the rotor to the VFD via the high-range voltage path to implement the HVAC system as a cooling system.

Aspect 6. The permanent magnet motor of any of Aspects 1-5, wherein the high-range voltage path carries a voltage of 460V.

Aspect 7. The permanent magnet motor of any of Aspects 1-6, wherein the high-range voltage path carries a maximum VFD output voltage for a cooling system.

Aspect 8. The permanent magnet motor of any of Aspects 1-7, wherein the permanent magnet motor is a multi-tap four-pole motor, wherein further each pole has a corresponding branch of coils, and the branches of coils for the four poles are in series.

Aspect 9. The permanent magnet motor of any of Aspects 1-8, wherein a number of poles for the permanent magnet motor is a multiple of four, and wherein further each pole has a corresponding branch of coils, and the branches of coils for the poles are in series.

Aspect 10. The permanent magnet motor of any of Aspects 1-9, wherein the low-range voltage path is connected wye with the VFD and the high-range voltage path is connected delta with the VFD.

Aspect 11. A method of controlling an operating mode of a permanent magnet motor in a heating, ventilation, air conditioning, and refrigeration (HVACR) system, the method comprising:
controlling speed of a rotor corresponding to the permanent magnet motor by switching between connections between the rotor and a variable frequency drive.

Aspect 12. A method of controlling an operating mode of a permanent magnet motor in a heating, ventilation, air conditioning, and refrigeration (HVACR) system, the method comprising:
controlling speed of a rotor corresponding to the permanent magnet motor by switching between wye-delta connections between the rotor and a variable frequency drive (VFD).

Aspect 13. The method of Aspect 12, wherein the wye-connection is a high-range voltage path.

Aspect 14. The method of either of either of Aspects 12 or 13, wherein the wye-connection powers the HVAC as a low speed, cooling system.

Aspect 15. The method of any of Aspects 12-14, wherein the delta-connection is a low-range voltage path.

Aspect 16. The method of any of Aspects 12-15, wherein the delta-connection powers the HVACR as a high speed, heating system.

Aspect 17. The method of any of Aspects 12-16, wherein the permanent magnet motor is a multi-tap four-pole motor, wherein further each pole has a corresponding branch of coils, and the branches of coils for the four poles are in series.

Aspect 18. The method of any of Aspects 12-17, wherein a number of poles for the permanent magnet motor is a multiple of four, and wherein further each pole has a corresponding branch of coils, and the branches of coils for the poles are in series.

The foregoing description and the following recitation of the present disclosure are provided for purposes of illustration, without being so limited. That is, various modifications may be made without departing from the scope and spirit of the present disclosure.

What is claimed is:

1. A permanent magnet motor for a heating, ventilation, air conditioning, and refrigeration (HVACR) system, comprising:
a rotor;
a stator having voltage taps to variably connect the rotor to either of a low-range voltage path and a high-range voltage path; and
a variable frequency drive (VFD) variably connected to the rotor via either the low-range voltage path or the high-range voltage path,
wherein the voltage taps connect the stator to the VFD via the low-range voltage path to implement the HVACR system as a heating system.

2. The permanent magnet motor of claim 1, wherein the low-range voltage path allows the motor to operate at higher speeds with the same input voltage.

3. The permanent magnet motor of claim 1, wherein the low-range voltage path carries a maximum VFD output voltage for a heating system.

4. The permanent magnet motor of claim 1,
wherein the permanent magnet motor is a multi-tap four-pole motor,
wherein further each pole has a corresponding branch of coils, and the branches of coils for the four poles are in series.

5. The permanent magnet motor of claim 1,
wherein a number of poles for the permanent magnet motor is a multiple of four, and
wherein further each pole has a corresponding branch of coils, and the branches of coils for the poles are in series.

6. The permanent magnet motor of claim 1, wherein the low-range voltage path is connected delta with the VFD and the high-range voltage path is connected wye with the VFD.

7. A method of controlling an operating mode of the permanent magnet motor of claim 1 in a heating, ventilation, air conditioning, and refrigeration (HVACR) system, the method comprising:
controlling speed of a rotor corresponding to the permanent magnet motor by switching between connections between the rotor and a variable frequency drive.

8. A permanent magnet motor for a heating, ventilation, air conditioning, and refrigeration (HVACR) system, comprising:
a rotor;
a stator having voltage taps to variably connect the rotor to either of a low-range voltage path and a high-range voltage path; and
a variable frequency drive (VFD) variably connected to the rotor via either the low-range voltage path or the high-range voltage path,
wherein the voltage taps connect the stator to the VFD via the high-range voltage path to implement the HVAC system as a cooling system.

9. The permanent magnet motor of claim 8, wherein the high-range voltage path optimizes the motor to operate at higher voltages and lower currents at lower speeds.

10. The permanent magnet motor of claim 8, wherein the high-range voltage path carries a maximum VFD output voltage for a cooling system.

11. The permanent magnet motor of claim 8,
wherein the permanent magnet motor is a multi-tap four-pole motor,
wherein further each pole has a corresponding branch of coils, and the branches of coils for the four poles are in series.

12. The permanent magnet motor of claim 8,
wherein a number of poles for the permanent magnet motor is a multiple of four, and
wherein further each pole has a corresponding branch of coils, and the branches of coils for the poles are in series.

13. The permanent magnet motor of claim 8, wherein the low-range voltage path is connected delta with the VFD and the high-range voltage path is connected wye with the VFD.

* * * * *